May 5, 1925.

N. H. KING

VEHICLE SUSPENSION DEVICE

Filed May 11, 1923

1,536,504

INVENTOR.
Nathan H. King
BY
ATTORNEY

Patented May 5, 1925.

1,536,504

UNITED STATES PATENT OFFICE.

NATHAN H. KING, OF MODESTO, CALIFORNIA.

VEHICLE SUSPENSION DEVICE.

Application filed May 11, 1923. Serial No. 638,162.

*To all whom it may concern:*

Be it known that I, NATHAN H. KING, a citizen of the United States, residing at Modesto, county of Stanislaus, State of California, have invented certain new and useful Improvements in Vehicle Suspension Devices; and I do declare the following to be a full, clear, and exact description of the same, reference being had to the accompanying drawings, and to the characters of reference marked thereon, which form a part of this application.

This invention relates to improvements in spring-suspension construction for motor vehicles, being particularly adapted to be employed at the front end of such vehicles as are equipped with the usual longitudinally disposed main springs of the semi-elliptic type.

The principal object of my invention is to provide a spring suspension device arranged in connection and co-operating with the usual main springs in such a manner that a perfectly counterbalanced spring action will be had, which will efficiently absorb and neutralize all shocks, and at the same time to provide means for relieving the springs and their shackles of all longitudinal strains, while allowing for the necessary freedom of movement and play of the springs independently of each other, without any binding, torsional, or other strains being placed on the relieving means when the axle of the front wheels assumes a transverse angle to the plane of the rigid frame of the car.

In other words, the device is constructed and arranged as a whole to give long and satisfactory service without repairs or attention for a long period of time.

I have also arranged the various parts so that they may be readily installed on a vehicle without necessitating any alterations being made to the chassis such as might weaken the same and would certainly add to the expense of installation.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
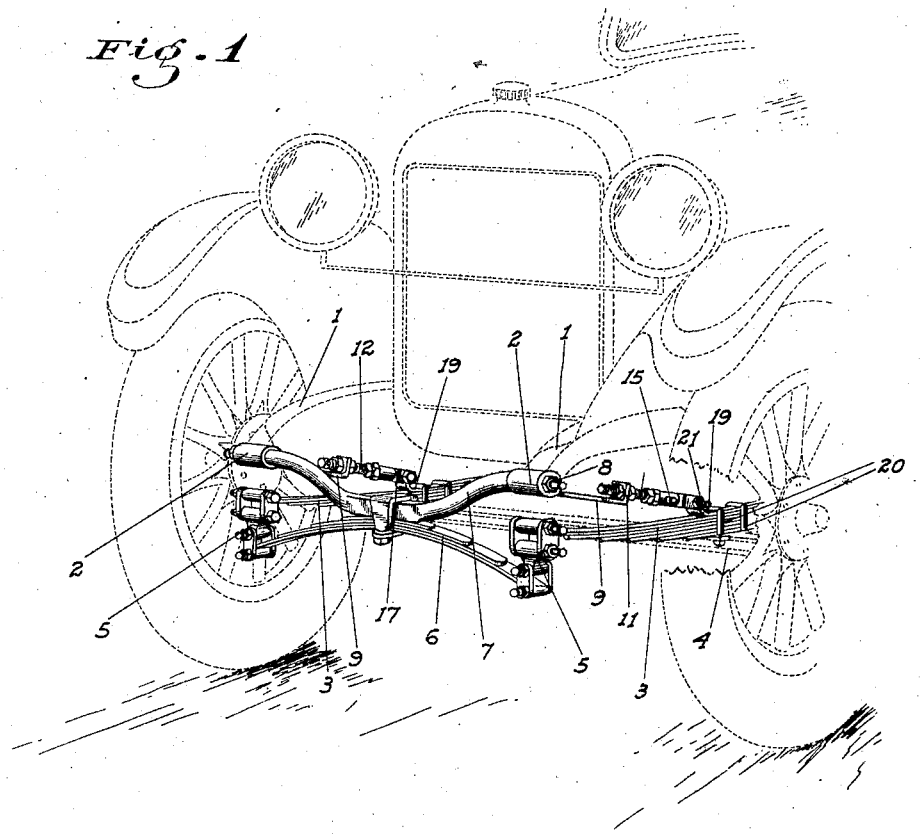
Fig. 1 is a perspective outline of the front end of an automobile, showing my improved spring suspension means installed thereon.
Figure 2:
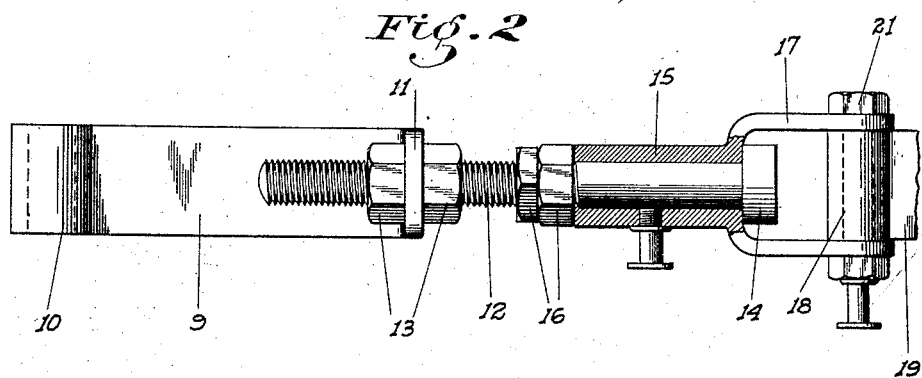
Fig. 2 is a top plan view, enlarged and partly in section, of a particular form of tension rod structure.

Referring now more particularly to the characters of reference on the drawings, the numeral 1 denotes the side frames of the car, terminating as usual in forked eyes 2 at the forward end. The usual main springs 3 of the front axle 4 are ordinarily connected direct to the eyes 2, and at their rear ends to the frames by shackles (not shown) as usual, and to the axle intermediate their ends.

My spring suspension structure may make use of the original main springs 3, or others may be installed in place thereof.

In either case, such springs 3 or their equivalent are disconnected from the eyes 2 and are lowered somewhat, being connected to the upper and transversely disposed pins of double-swivel shackles 5, such as are already in use elsewhere. To the lower and longitudinally disposed pins of said shackles are connected the ends of a transverse spring 6, which is securely strapped at its center to a cross beam 7 thereabove which extends between the frames 1 and is connected thereto at the eye members 2 by bolts or pins 8 passing through the latter.

It will therefore be seen that any shock taken by either main spring 3 will be immediately transferred to the other main spring through the intermediate spring 6, so that the shock is divided between all three springs, and its shocking effect greatly lessened if not completely eliminated.

Some means however must be provided for removing the pulling strain thus placed on the cross spring 6 and its connected parts.

For each main spring 3, I therefore employ a special form of tension-rod structure built up of the following parts: The front end consists of a preferably flat bar 9 having at its forward end an eye 10 adapted to fit on the member 2 and secured therein by the bolts 8. This bar is detachable from the remainder of the tension rod structure, so that different widths, to suit the eyes 2 of different cars, may be easily provided.

At the rear end of the bar is an upturned flange 11, through which passes the front end of a bolt 12, nuts 13 being on the bolt on both sides of the flange. By means of this construction, the length of the structure may be altered as may be necessary.

The rear end of the bolt or rod 12 has a head 14 which bears against the rear end of a sleeve 15 which extends for a portion of the distance between said head and the flange 11 and in which the adjacent portion of the bolt 12 is turnable with a running fit.

Locknuts 16 on the bolt ahead of the sleeve and adjacent thereto prevent longitudinal movement of the bolt in the sleeve while enabling take-up due to wear being had.

Provided at the rear end of the sleeve 15 and extending rearwardly therebeyond is a horizontal yoke 17. The rear end of this yoke is adapted to straddle the up-turned eye 18 of a plate 19 resting on the upper leaf of the adjacent main spring 3 and extending somewhat ahead of the axle 4, being connected to said spring by the same U-bolts 20 as are used to clamp the spring to the axle. A pin 21 through the eye 18 and yoke 17 pivots the two together.

It will therefore be seen that the tension pulling strain between the axle and frames is taken directly by the tension rods, relieving the springs of any such strain and allowing them to freely function as intended.

As the same time, due to the turnable or swivel connection between the two parts of each rod, there is no torsional strain placed on the latter such as would otherwise be the case when as frequently occurs, the axle 4 assumes an angle to the transverse plane of the frames 1, in which case the axial lines of the spring-mounted eyes 18 and the frame-eyes 2 are at a similar angle to each other.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

A tensioning rod for the structure described comprising a flat bar having a sleeve at one end and an upturned flange at its opposite end, a bolt adjustably and removably mounted through the flange, and a yoked sleeve, the bolt being turnably mounted in the sleeve.

In testimony whereof I affix my signature.

NATHAN H. KING.